Patented Jan. 2, 1945

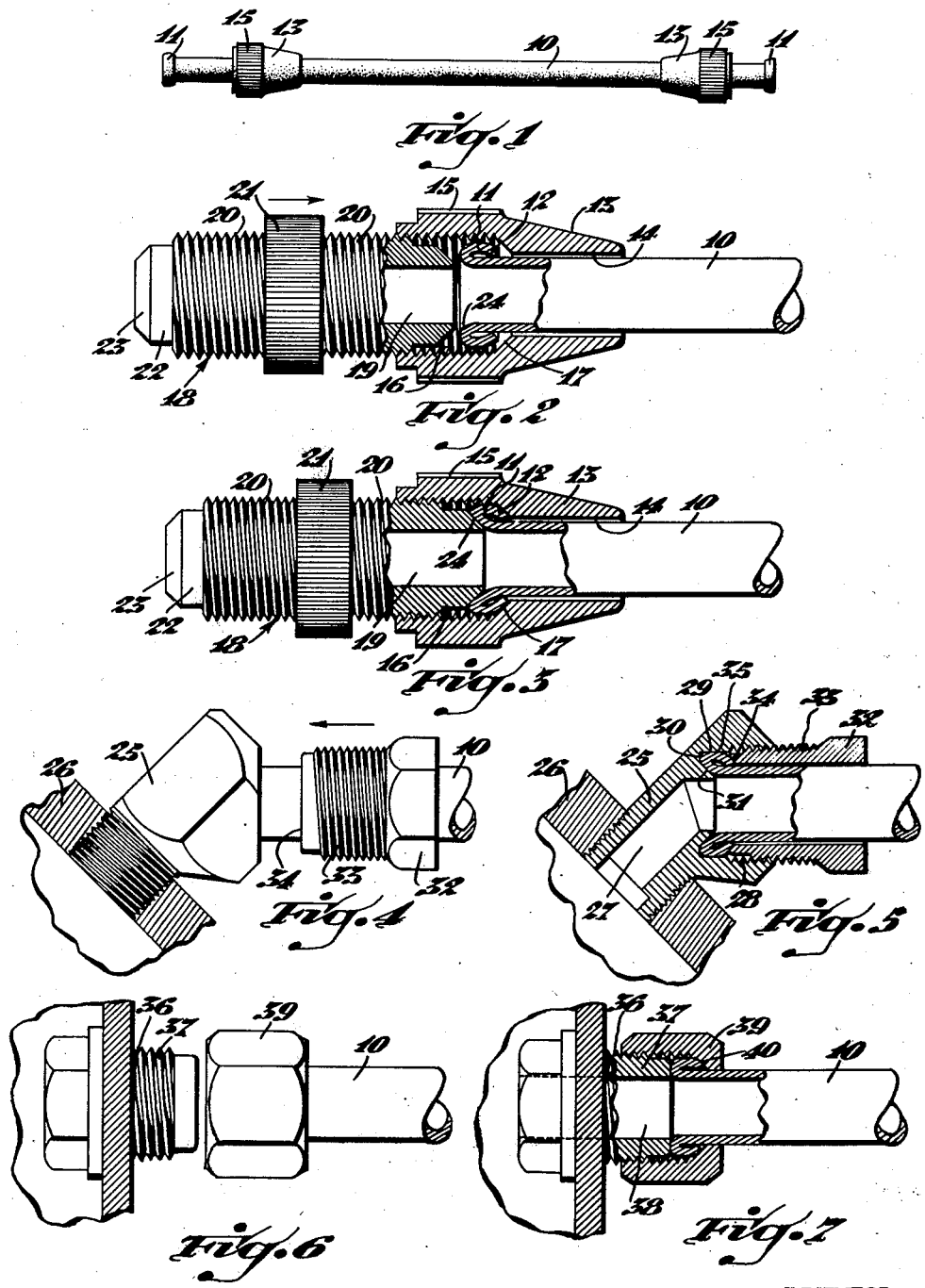

2,366,444

UNITED STATES PATENT OFFICE 2,366,444

COUPLING FOR TUBING

Jack R. Dorman, Cincinnati, Ohio

Application October 29, 1942, Serial No. 463,785

1 Claim. (Cl. 285—86)

This invention relates to a tubing and coupling construction and is particularly directed to coupling means for tubing formed of a plastic material. More specifically, the invention relates to the formation of the ends of conventional plastic tubing, the provision of coupling elements for attaching these ends to the part to be supplied or which is supplied, and the relationship of these parts so that an effective and perfectly sealed coupling is formed. The present improvements are applied to standard and well-recognized plastic tubing.

Accordingly, it has been an object of the present inventor to provide tubing having its ends formed in such manner as to cooperate with the coupling elements to provide a sealing connection and a sufficiently rigid connection without the application of any great amount of pressure. In fact, the coupling of this invention may be completed merely by applying manual pressure.

In the development of the present invention, the inventor has recognized a characteristic of this type of tubing as well as a characteristic of certain types of compositions which may be used in the manufacture of the coupling fittings. These parts, when clamped together, tend to grip more readily than has been realized. Considerable friction occurs and this is believed to be due to the compressibility and softness of the material. A remarkably tight connection can be procured with very little turning force.

It has been a further object of the present inventor to provide coupling elements associated with the formed ends of the tubing and in this combination to bring about a compressive action upon the formed end of the tubing. This action is assisted by the material of the tubing and the connection is not easily broken by vibration. Due to the softness of the materials, a tight seal is produced having the effectiveness of a coupling which includes a gasket.

It has been a further object of the present inventor to provide a formation at the end of the tubing and a coupling means wherein a springing action is procured and wherein separate and not adjacent surfaces of the same thickness of tubing material are gripped. Thus, a seal is produced at two points on separate portions of the tubing material, and these portions are pressed toward each other wherein they continue to exert a spring action by tending to spring back to their normal uncoupled condition. The form of the coupling elements is such that a wedging takes place unlike the usual gripping of opposite sides of a gasket or a flared end of the tube.

Other objects and certain advantages will be more fully apparent from a description of the drawing in which:

Figure 1 is a side view of a length of tubing illustrating the formed ends and showing coupling elements thereon.

Figure 2 is an enlarged fragmentary view partly in section illustrating the details of the connection and showing the parts just prior to final clamping action.

Figure 3 is a view taken similar to Figure 2 but showing the coupling fully tightened.

Figure 4 is a fragmentary view showing a modified form of coupling.

Figure 5 is a sectional view of the coupling arrangement of Figure 4 showing the coupling completed.

Figure 6 is a view showing a further modification of the coupling with the parts separated.

Figure 7 is a view showing the coupling of Figure 6 in coupled position with certain of the parts broken away and shown in section for illustrative purposes.

Referring generally to the drawing, a length of tubing is indicated at 10. This tubing is formed of a material which is plastic and preferably transparent or translucent. The material is highly flexible and has a certain amount of springiness. Its surface is not hard but rather may be indented; it could hardly be called soft but at the same time it will make very close contact with a surface engaged against it. It will adjust itself to any irregularities in the engaging surface and thus has admirable sealing qualities.

Thus, in the present instance, the inventor has specifically formed the ends of this tubing so that they cooperate with coupling elements to give the maximum gripping and sealing action. For this purpose, a cuff 11 is formed at the end of the tubing to be attached. Specifically, the end is turned outwardly and back upon itself and presents a sort of beaded end for attachment purposes. The flange 12, constituting the cuff, is rounded so that it presents an axially convex surface when viewed from the exterior. This provides for a certain amount of flexing, yielding for compression of the bead (note particularly Figure 3) when the coupling elements are clamped upon the bead. Further, this material has the structural characteristic that it may be stretched a reasonable amount without splitting or rupturing.

In order to couple the end of the tubing thus formed to the part supplying or being supplied, or in any other environment where a connection is desired, two coupling elements are desired. One of these, indicated at 13, is loosely slidably mounted on the tubing. This element is placed on the tubing prior to the formation of the cuff or beading. It includes a sleeve portion of substantial length including a bore 14 through which the tube passes. Further, it includes an externally knurled gripping portion indicated at 15. Screw threads 16 are formed in an enlarged bore at the outer end of the element. The shoulder 17 between the plain bore 14 and the screw threads 16 is inclined or conical.

The other coupling element 18 is also in the form of a sleeve including a bore 19 throughout its length. It is provided with external screw threads 20 at each end, separated by a knurled gripping portion 21. At each end of the coupling element 18 is provided a plain extension 22, the end face of each plain extension being chamfered or conical. The angles of these portions 23 correspond to the angle of the shoulder 17.

When the beaded end of the tubing is drawn upon the element 18, as the screw threads 16 engage with screw threads 20 and the shoulder 17 engages the cuff, the tapered end of the coupled element 18 enters the end of the tubing.

Thus, a spreading action ensues as shown in Figure 3. The material stretches to permit this and an excellent sealing engagement is provided within the rounded internal surface 24 at the end of the tubing. Likewise, the engagement of the shoulder 17 with the cuff tends to flatten or compress the cuff portion and the tension or springiness of the material continues thereafter to maintain a tight contact with the shoulder. In other words, a squeezing action is brought about on the beaded end of the tube that is upon the cuff and the adjacent end portion of the tube.

A composition material is used for the fitting elements and the frictional characteristics of the surfaces of the coupling elements and the tube material make it easy to obtain a tight seal and connection without the use of a tool and merely by hand pressure. The cuff and the end portion of the tube engaged between the surfaces of the coupling elements are effective as a sealing gasket.

In the modified form shown in Figures 4 and 5, the arrangement of the coupling contact surfaces is slightly varied. The fixed element 25 is engaged in a supporting wall 26. The outer end of its bore 27 is screw-threaded as at 28. A plain bore portion 29 is provided beyond the screw threads, that is, at the inner end of the bore. The shoulder between the outer end of the bore and the main bore portion 27 has a flat portion 30 encircling a conical or inclined portion 31.

The other coupling element 32 is loosely mounted on the tubing and includes screw threads 33 cooperating with the screw threads of the fitting 25. The inner end of this element is inclined to provide a concave gripping surface 34, the angle of this corresponding to that of the surface 31. Thus, as the element 32 is screwed into the element 25, the cuff or bead is pressed into the annular recess created by the inclined shoulder 31 and the sealing action takes place within the end of the tube against the shoulder 31 and against the outer surface of the cuff as at 35 through the inclined end face of the element 32. The same action of frictional grip and the compressibility of the bead are present in this form.

In the modification shown in Figures 6 and 7, the attached element 36 provides an externally screw-threaded extension 37. This element includes a plain end surface at right angles to the axes of the tubing and the coupling. The inner bore 38 of this coupling element and that of the tubing are substantially of the same diameter. A coupling nut or sleeve 39, loosely mounted on the tubing, includes internal screw threads for engagement on those of the element 36. As in the form shown in Figures 1 to 3 inclusive, a tapered or conical shoulder 40 in the coupling nut engages the outer surface of the cuff. Thus, in this form, the end of the tubing is abutted directly against the straight end surface of the coupling 36.

Having described my invention, I claim:

In a coupling, a length of tubing formed of plastic material, said tubing having its end flared outwardly in a flange turned back to form a curved cuff, the tubing having a flared opening to its bore, and a pair of coupling elements, one having an internally conical end adapted to engage the cuff and the other of said coupling elements having a groove, one wall of which forms a tapered seating surface adapted to engage within the flared opening of the tubing, said last named tapered seating surface being substantially parallel to said conical end, the bore of the first-named coupling element being adapted to closely engage the exterior of the tubing for forcing the cuff into said groove, whereby the cuff and the material of the tubing adjacent thereto are gripped together between the conical surface and the tapered seating of the other coupling element, the plastic material of the cuff being yieldable and pliable for producing a sealed connection.

JACK R. DORMAN.